United States Patent
Kamperschroer et al.

(10) Patent No.: US 6,650,907 B1
(45) Date of Patent: Nov. 18, 2003

(54) METHOD FOR PRODUCING A SEMICONDUCTOR STORAGE DEVICE

(75) Inventors: Erich Kamperschroer, Hamminkeln (DE); Uwe Schwark, Bocholt (DE); Edgar Bolinth, Mönchengladbach (DE); Michael Färber, Wolfratshausen (DE); Anja Klein, Berlin (DE); Meik Kottkamp, Berlin (DE); Armin Sitte, Berlin (DE); Thomas Ulrich, Berlin (DE); Michael Benz, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/720,476

(22) PCT Filed: Jun. 23, 1999

(86) PCT No.: PCT/DE99/01829

§ 371 (c)(1),
(2), (4) Date: Mar. 22, 2001

(87) PCT Pub. No.: WO99/53544

PCT Pub. Date: Oct. 21, 1999

(30) Foreign Application Priority Data

Jun. 23, 1998 (DE) ........................................ 198 27 920

(51) Int. Cl.$^7$ ............................................. H04B 17/00
(52) U.S. Cl. .................... 455/522; 455/69; 370/318
(58) Field of Search ................... 455/522, 69, 12.1, 455/427, 423; 370/318

(56) References Cited

U.S. PATENT DOCUMENTS

| | | | | | |
|---|---|---|---|---|---|
| 5,956,638 | A | * | 9/1999 | Chang et al. | 455/423 |
| 5,983,101 | A | * | 11/1999 | Billstrom | 455/426 |
| 6,246,713 | B1 | * | 6/2001 | Mattisson | 375/132 |
| 6,483,826 | B1 | * | 11/2002 | .ANG.kerberg | 370/335 |

* cited by examiner

Primary Examiner—Nay Maung
Assistant Examiner—Alan Gantt
(74) Attorney, Agent, or Firm—Bell Boyd & Lloyd LLC

(57) ABSTRACT

In order to control the transmitting power provided for point-to-multipoint telecommunications links in a telecommunications system with wireless telecommunication and uncoordinated unlicensed system operation, without significant restriction of the transmitting range, use is made of the fact that the maximum number of mobile stations (MS1 . . . MSn) registered in a base station (BS1) is known. Thus, the base station knows at any time how many and which mobile stations are registered. If all mobile stations are registered ($N_{ACT}=N_{SCHED}$), the base station can match the transmitting power to the mobile station received as the "weakest one". In other cases, if not all mobile stations are registered ($N_{ACT} \neq N_{SCHED}$), the base station will alternately transmit with the maximum transmitting. power for a predetermined first period of time and then with the reduced transmitting power, which matches the mobile station received as the "weakest one", for a predetermined second period of time.

4 Claims, 2 Drawing Sheets

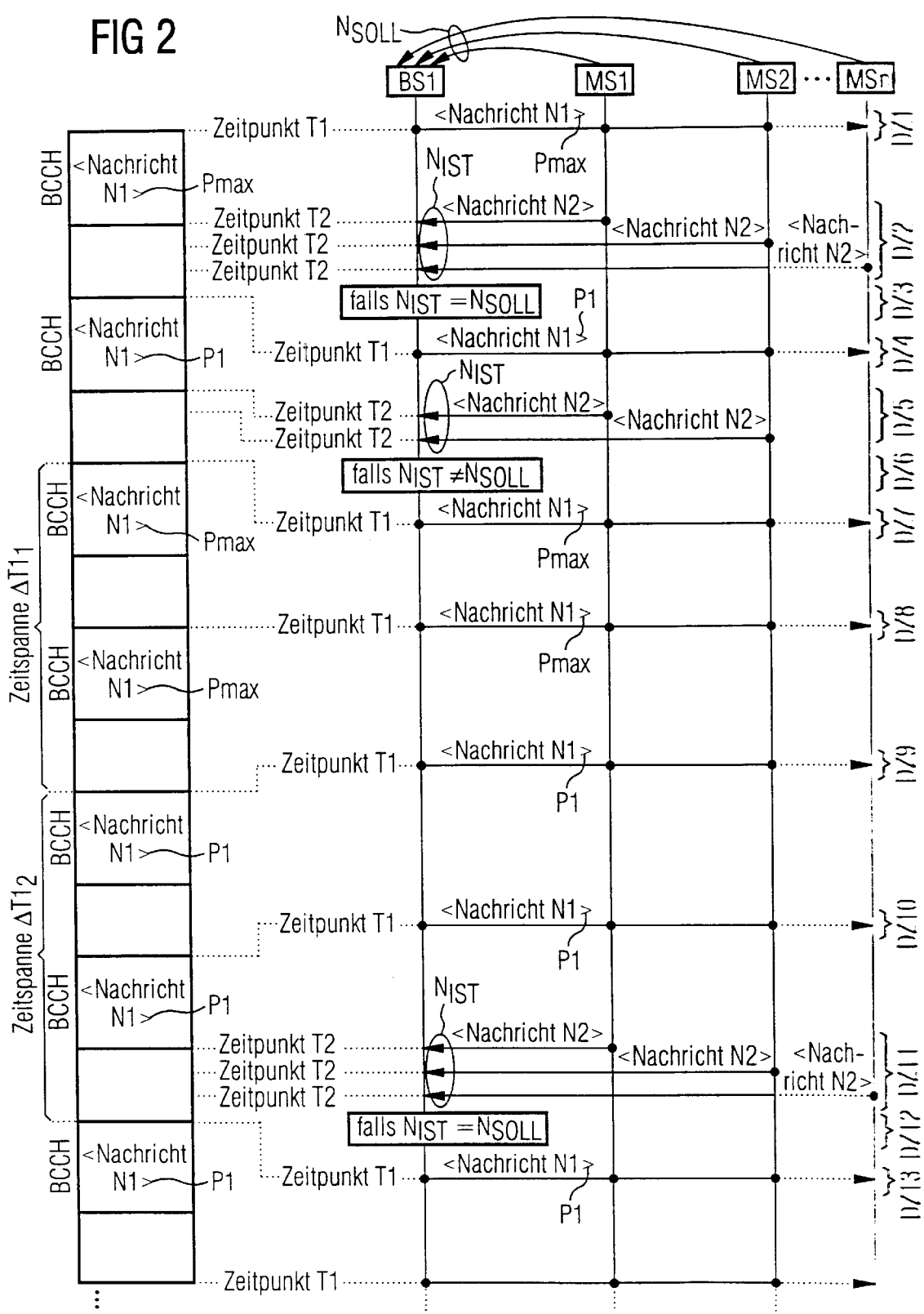

METHOD FOR PRODUCING A SEMICONDUCTOR STORAGE DEVICE

BACKGROUND OF THE INVENTION

Telecommunications systems with wireless telecommunications between mobile and/or stationary transceivers are special communication systems with a message transmission path between a message source and a message sink in which, for example, base stations and mobile parts are used as transceivers for message processing and transmission and in which 1) the message processing and message transmission can take place in one preferred direction of transmission (simplex mode) or in both directions of transmission (duplex mode),
2) the message processing is preferably digital,
3) the message transmission takes place wirelessly via the long-distance transmission link on the basis of various message transmission methods for multiple utilization of the message transmission link FDMA (Frequency Division Multiple Access), TDMA (Time Division Multiple Access) and/or CDMA (Code Division Multiple Access)—e.g. according to radio standards such as DECT [Digital Enhanced (previously: European) Cordless Telecommunications; compare *Nachrichtentechnik Elektronik* 42 (1992) January/February No. 1, Berlin, DE; U. Pilger *"Struktur des DECT-Standards"* [*Structure of the DECT standard*], pages 23 to 29 in conjunction with ETSI Publication ETS 300175-1 . . . 9, October 1992 and the DECT Publication of the *DECT Forum*, February 1997, pages 1 to 16], GSM [Groupe Speciale Mobile or Global System for Mobile Communication; compare *Informatik Spektrum* 14 (1991) June, No. 3, Berlin, DE; A. Mann: *"Der GSM— Standard—Grundlage für digitale europäische digital European mobile radio networks*], pages 137 to 152 in conjunction with the publication *telekom praxis* April 1993, P. Smolka *"GSM-Funkschnittstelle—Elemente und Funktionen"*, [*GSM Radio Interface—Elements and Functions*], pages 17 to 24], UMTS [Universal Mobile Telecommunications System; compare (1): *Nachrichtentechnik Elektronik, Berlin* 45, 1995, vol. 1, pages 10 to 14 and vol. 2, pages 24 to 27; P. Jung, B. Steiner: *"Konzept eines CDMA-Mobilfunksystems mit gemeinsamer Detektion für die dritte Mobilfunkgeneration"* [*Concept of a CDMA mobile radio system with joint detection for the third mobile radio generation*]; (2): *Nachrichtentechnik Elektronik, Berlin* 41, 1991, vol. 6, pages 223 to 227 and page 234; P. W Baier, P. Jung, A. Klein: *"CDMA—ein günstiges Vielfachzugriffsverfahren für frequenzselektive und zeitvariante Mobilfunkkanäle"* [*CDMA—a favorable multiple access method for frequency-selective and time-variant mobile radio channels*]; (3): *IEICE Transactions on Fundamentals of Electronics, Communications and Computer Sciences*, Vol. E79-A, No. 12, December 1996, pages 1930 to 1937; P. W. Baier, P. Jung: *"CDMA Myths and Realities Revisited"*; (4): *IEEE Personal Communications*, February 1995, pages 38 to 47; A. Urie, M Streeton, C Mourot: *"An Advanced TDMA Mobile Access System for UMTS"*; (5): *telekom praxis*, May 1995, pages 9 to 14; P. W. Baier: *"Spread-Spectrum-Technik und CDMA—eine urspruglich militärische Technik erobert den zivilen Bereich"* [*Spread Spectrum Technology and CDMA—a technology of military origin conquers the civil domain*]; (6): *IEEE Personal Communications*, February 1995, pages 48 to 53; P. G. Andermo, L. M. Ewerbring: *"An CDMA-Based Radio Access Design for UMTS"*; (7): *ITG Pachberichte* 124 (1993), *Berlin, Offenbach: VDE Verlag* ISBN 3-8007-1965-7, pages 67 to 75; Dr. T. Zimmermann, Siemens AG: *"Anwendung von CDMA in der Mobilkommunikation"* [*Applying CDMA in mobile communications*]; (8): *telecom report* 16, (1993), vol. 1, pages 38 to 41; Dr. T. Ketseoglou, Siemens AG and Dr. T. Zimmermann, Siemens AG: *"Effizienter Teilnehmerzugriff für die 3. Generation der Mobilkommunikation—Vielfachzugriffsverfahren CDMA macht Luftschnittstelle flexibler"* [*efficient subscriber access for the 3rd generation of mobile communications—the multiple access method CDMA makes the air interface more flexible*]; (9): *Funkschau June* 1998: R. Sietmann *"Ringen um die UMTS-Schnittstelle"* [*The struggling for the UMTS interface*], pages 76 to 81] WACS or PACS, IS-54, IS-95, PHS, PDC etc. [compare IEEE Communications Magazine, January 1995, pages 50 to 57; D. D. Falconer et al: "Time Division Multiple Access Methods for Wireless Personal Communications"].

"Message" is a generic term which stands both for the meaning (information) and for the physical representation (signal). Even if a message has the same meaning—i.e. the same information—different signal forms can occur. Thus, for example, a message concerning an object can be transmitted (1) in the form of an image,
(2) as spoken word,
(3) as written word,
(4) as encrypted word or image.

The type of transmission according to (1) . . . (3) is here normally characterized by continuous (analog) signals, whereas the type of transmission according to (4) normally produces discontinuous signals (e.g. pulses, digital signals).

It is of great importance to carry out a power control for the telecommunications systems specified above, and especially for the CDMA-based telecommunications systems, because of the "near-far" (compare: (10) K. D. Kammeyer "Nachrichtenübertragung" [Message Transmission], B. G. Teubner Stuttgart 1996, chapter 16.1.3, especially page 636; (11) K. David/T. Benkner "Digitale Mobilfunksysteme" [Digital Mobile Radio Systems], B. G. Teubner Stuttgart 1996, chapter 8.7.2.2, especially page 414).

Power control is known as a means for reducing interference in multicellular mobile radio networks. The basic idea is to allocate to each subscriber only the amount of transmitting power currently needed by him for achieving the desired quality of service. This measure clearly reduces the interference with respect to other subscribers in the same or adjacent cells. However, this technique can only be applied to so-called "point-to-point" connections in cellular mobile radio since, in this case, the transmitting powers to be used for the transmission, e.g. between stationary and mobile transceivers, that is from a base station or fixed part to the mobile station or mobile part and vice versa, can be explicitly dedicated to the link between the base station and mobile station.

In mobile radio telecommunications systems (e.g. GSM, UMTS) which operate preferably in licensed coordinated system operation, and in cordless telecommunications systems (e.g. DECT, PHS etc.) which preferably operate in unlicensed uncoordinated system operation, however, point-to-multipoint connections are also used. Channels using such links are generally Control Channels, the so-called "Common Control Channels (CCCH)". The most important representative of this category is, without any doubt, the so-called "Broadcast Control Channel (BCCH)". It is radiated in the down link (DL) by the base station. The broadcast control channel has the task of transporting cell-related information and synchronization information. These information items are used by all mobile stations located within the cell. Since, however, the positions of the mobile stations within the radio cell and thus also the transmitting powers needed can differ greatly, it is not possible to control the transmitting power of the broadcast control channel in cellular mobile radio. As a rule, the transmitting power of the broadcast control channel is adapted in such a manner that it can still be received with adequate power by all mobile stations at the edge of the cell.

Power control is not used either for the "traffic channel (TCH)" or for the "broadcast control channel" in the previous cordless telecommunications systems (e.g. DECT).

SUMMARY OF THE INVENTION

The object forming the basis of the invention consists in controlling the transmitting power provided for point-to-multipoint telecommunications links in a telecommunications system with wireless telecommunications and uncoordinated unlicensed system operation—especially in a universal mobile telecommunications system with uncoordinated unlicensed system operation and a coordinated licensed system operation, without significant restriction of the transmitting range.

This object is achieved by a method for controlling power in point-to-multipoint telecommunications links in telecommunications systems with wireless telecommunications and uncoordinated unlicensed system operation, comprising the following features: (a) a SCHEDULED number of mobile parts registered in the base station is allocated to the coverage area of a base station supporting uncoordinated unlicensed system operation, (b) the base station sends a first message to the mobile parts located within the coverage area of the base station at a predetermined first time recurring at regular intervals in connection with a point-to-multipoint telecommunications link, (c) the respective mobile part sends a second message to the base station in each case at a mobile-part-specific second time recurring at regular intervals, the second time being determinable by events, such as especially the entry of the mobile part into the coverage area, the exit of the mobile part from the coverage area and/or the request for setting up a point-to-point telecommunications link by the mobile part, (d) the base station detects, by means of the second messages sent by the mobile parts, an ACTUAL number of mobile parts registered in the base station and located within the coverage area of the base station, (e) if the ACTUAL number matches the SCHEDULED number, the base station sends the first message with a first transmitting power which is reduced compared with a maximum power and which is dimensioned in such a manner that a mobile part, the second message of which has been received as the weakest one in the base station, still reliably receives the first message, (f) if the ACTUAL number does not match the SCHEDULED number, the base station alternately sends the first message with the maximum transmitting power for a predetermined first period of time and then with the first transmitting power for a predetermined second period of time.

The concept, proposed above, for the power control of point-to-multipoint telecommunications links—especially of the broadcast control channel—for telecommunications systems with wireless telecommunications and uncoordinated unlicensed system operation—especially future cordless telecommunications systems such as "residential UMTS" systems—makes use of the fact that the maximum number of mobile stations registered in a base station is known. Thus, the base station knows at any time how many and which mobile stations are registered. If all mobile stations are registered—i.e. if a SCHEDULED number of mobile stations registered in the base station corresponds to an ACTUAL number of mobile stations registered in the base station ($N_{ACT}=N_{SCHED}$)—, the base station can match the transmitting power (first transmitting power) to the mobile station received as the "weakest one". In other cases, if not all mobile stations are registered—i.e. if the SCHEDULED number of mobile stations registered in the base station does not correspond to the ACTUAL number of mobile stations registered in the base station ($N_{ACT} \neq N_{SCHED}$)—, the base station will alternately transmit with the maximum transmitting power for a predetermined first period of time and then with the reduced transmitting power, which matches the mobile station received as the "weakest one", for a predetermined second period of time. This provides for an optimum (dynamic) matching of the transmitting power to the continuously varying number of mobile stations located within the coverage area of the base station.

This procedure described above is possible because, as a rule, one mobile station will be operated for each base station and this is also registered, as a rule, in cordless telecommunications systems. The transmitting power selected by the base station in the first-mentioned case (all mobile stations are registered) will essentially be reduced compared with the maximum transmitting power (in the clearly predominant number of cases). The power-controlled point-to-multipoint telecommunications link minimizes the interference with other cordless telecommunications systems and thus improves the capability of coexistence. The method described above is suitable both for TDMA/FDMA-based systems and for CDMA-based systems. Power control is essential especially for CDMA-based systems since this makes it possible to considerably reduce the "near-far" problem.

According to a preferred embodiment, it is advantageous if the second period of time, according to a limit value consideration for periods of time, on the assumption, which is generally valid for this, that a period of time can have a positive value between "zero" and—viewed theoretically—"arbitrary or infinite", has the value "zero", that is to say the base station only transmits with maximum transmitting power if the ACTUAL number does not match the SCHEDULED number, the base station alternately sends the first message with the maximum transmitting power for a predetermined first period of time and then with the first transmitting power for a predetermined second period of time.

Additional advantageous further developments of the invention are provided in that the point-to-multipoint telecommunications link is used for a broadcast control channel. The wireless telecommunications is carried out in accordance with the CDMA, FDMA, and/or TDMA access method and in accordance with the TDD and/or FDD principle.

BRIEF DESCRIPTION OF THE DRAWINGS

An exemplary embodiment of the invention is explained with reference to FIGS. 1 and 2, in which:

FIG. 2 shows a message flowchart for the power-controlled transmission of messages in point-to-multipoint telecommunications links.

DETAILED DESCRIPTION OF THE PREFERRED EMBODIMENTS

Figure 1:
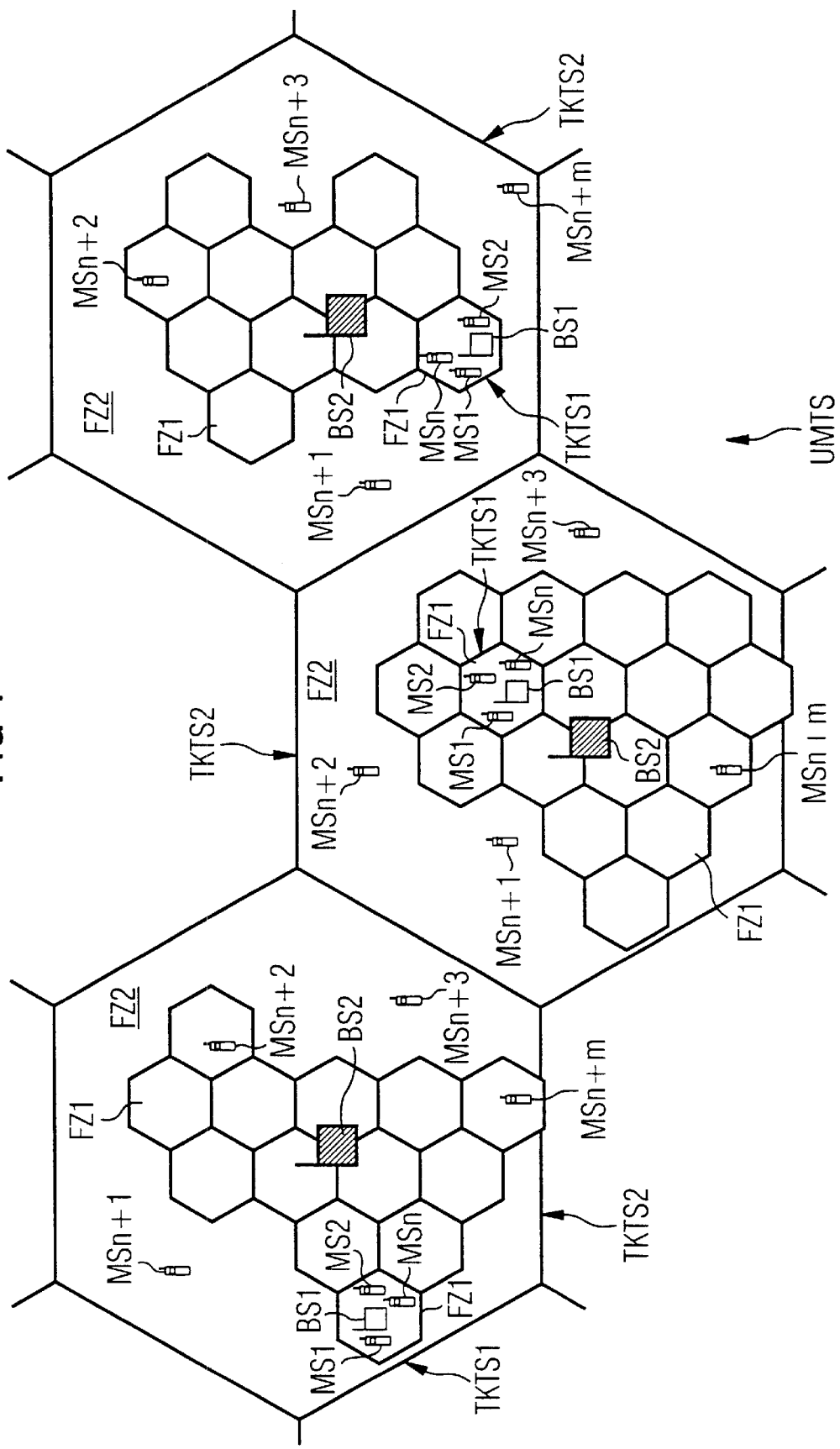
FIG. 1 shows a possible UMTS scenario with the section from a universal mobile telecommunications network and a universal mobile telecommunications system operating both in uncoordinated unlicensed system operation and in coordinated licensed system operation.

FIG. 1 shows a possible UMTS (Universal Mobile Telecommunications System) scenario comprising a multicellular universal mobile telecommunications system UMTS operating both in uncoordinated unlicensed system operation and in coordinated licensed system operation. The UMTS system shown exhibits a first telecommunications subsystem TKTS1, acting in first radio cells FZ1, with wireless telecommunications between a first base station BS1 and with n (n∈N) first mobile stations MS1 ... MSn, which operates in uncoordinated unlicensed system operation. Moreover, the UMTS system exhibits a second telecommunications subsystem TKST2, acting in second radio cells FZ2, with wireless telecommunications between a second base station BS2 and with m (m∈N) second mobile stations MSn+1 ... MSn+m, which operates in coordinated licensed system operation.

FIG. 2 shows a message flowchart with 13 diagram states occurring successively in time for the power-controlled transmission of first messages N1 in point-to-multipoint telecommunications links by the first base station BS1 to the mobile stations MS1 ... MSn. In the message flowchart shown, it is assumed that the mobile stations MS1 ... MSn specifying a SCHEDULED number $N_{SCHED}$ are registered in the first base station BS1.

In a first diagram state DZ1, the base station BS1 sends the first message 1 with a maximum transmitting power Pmax on the broadcast control channel BCCH to the mobile stations MS1 ... MSn at a first time T1.

In a second diagram state DZ2, the mobile stations MS1 ... MSn send a second message N2 to the base station BS1 at a second time T2. The mobile stations MS1 ... MSn sending this second message N2 are combined by means of an ACTUAL number $N_{ACT}$.

In a third diagram state DZ3, the base station BS1 determines that the ACTUAL number $N_{ACT}$ and the SCHEDULED number $N_{SCHED}$ are equal.

In a fourth diagram state DZ4, the base station BS1 sends the first message N1 with a first transmitting power P1, which is reduced compared with the maximum transmitting power Pmax, in the broadcast control channel BCCH to the mobile stations MS1 ... MSn at the first time T1. The first transmitting power P1 is dimensioned in such a manner that a mobile part MS1 ... MSn, the second message N2 of which has been received as the weakest by the base station BS1, still receives the first message N1 reliably.

In a fifth diagram state DZ5, the mobile stations MS1, MS2 send the second message N2 to the base station BS1 at the second time T2. The mobile stations MS1 ... MSn sending this second message N2 are combined in the ACTUAL number $N_{ACT}$.

In a sixth diagram state DZ6, the base station BS1 determines that the ACTUAL number $N_{ACT}$ and the SCHEDULED number $N_{SCHED}$ are unequal.

In a seventh diagram state DZ7, the base station BS1 sends the first message N1 with the maximum transmitting power Pmax in the broadcast control channel BCCH to the mobile stations MS1 ... MSn at the first time T1. Sending of the first message N1 with the maximum transmitting power Pmax in the broadcast control channel BCCH to the mobile stations MS1 ... MSn at the first time T1 also takes place in an eighth diagram state DZ8. The period of time which has elapsed from the seventh diagram state DZ7, via the eighth diagram state DZ8, to a ninth diagram state DZ9 is specified by a first period of time $\Delta T1_1$.

After this first period of time $\Delta T_1$, has elapsed, the first message N1 is sent with the first transmitting power P1 in the broadcast control channel BCCH to the mobile stations MS1 ... MSn from the base station BS1 at the first time T1. Sending the first message N1 with the first transmitting power P1 in the broadcast control channel BCCH to the mobile stations MS1 ... MSn at the first time T1 also takes place in a tenth diagram state DZ10. The period of time which has elapsed from the ninth diagram state DZ9, via the tenth diagram state DZ10, to a thirteenth diagram state DZ13 is specified by means of a second period of time $\Delta T1_2$.

In the period from the sixth diagram state DZ6 to this tenth diagram state DZ10, it is assumed that the ACTUAL number $N_{ACT}$ and the SCHEDULED number $N_{SCHED}$ remains unchanged, that is to say unequal. If this is not the case, the sequence is preferably immediately continued in the same manner as described in the fourth diagram state DZ4. As an alternative, it is also possible to allow the corresponding period $\Delta T1_1$, $\Delta T1_2$ to run its complete course and not to abort.

In an eleventh diagram state DZ11, the mobile stations MS1 ... MSn send the second message N2 to the base station BS1 at the second time T2. The mobile stations MS1 ... MSn sending this second message N2 are again combined in the ACTUAL number $N_{ACT}$.

In a twelfth diagram state DZ12, the base station BS1 determines that the ACTUAL number $N_{ACT}$ and the SCHEDULED number $N_{SCHED}$ are again equal.

In the thirteenth diagram state DZ13, the base station BS1 sends the first message N1 with the first transmitting power P1 in the broadcast control channel BCCH to the mobile stations MS1 ... MSn at the first time T1—as in the fourth diagram state DZ4.

The diagram states now following have been dealt with by the 13 diagram states described above.

Although other modifications and changes may be suggested by those skilled in the art, it is the intention of the inventors to embody within the patent warranted hereon all changes and modifications as reasonably and properly come within the scope of their contribution to the art.

We claim:

1. A method for controlling power in point-to-multipoint telecommunications links in telecommunications systems with wireless telecommunications and uncoordinated unlicensed system operation, comprising the following features:
   (a) allocating a SCHEDULED number of mobile parts registered in the base station to a coverage area of a base station supporting uncoordinated unlicensed system operation,
   (b) sending a first message to the mobile parts located within the coverage area of the base station at a predetermined first time recurring at regular intervals in connection with a point-to-multipoint telecommunications link by the base station,
   (c) sending a second message to the base station in each case at a mobile-part-specific second time recurring at regular intervals by the respective mobile part, the second time being determinable by events, (d) detecting an ACTUAL number of mobile parts registered in the base station and located within the coverage area of the base station by the base station using second messages sent by the mobile part, (e) if the ACTUAL number matches the SCHEDULED number, sending by the base station the first message with a first transmitting power which is reduced compared with a maximum power and which is dimensioned in such a manner that a mobile part, the second message of which has been received as the weakest one in the base station, still reliably receives the first message, (f) if the ACTUAL number does not match the SCHEDULED number, sending by the base station the first message with the maximum transmitting power for a predetermined first period of time and then with the first transmitting power for a predetermined second period of time.

2. The method as claimed in claim 1, wherein a period value "zero" is allocated to the second period of time.

3. The method as claimed in claim 1, further comprising the step of:

using a point-to-multipoint telecommunications link for a broadcast control channel.

4. The method as claimed in claim 1, wherein wireless telecommunications is carried out in accordance with one of CDMA, FDMA, and TDMA access method and in accordance with one of TDD and FDD principle.

* * * * *